(12) United States Patent
Hogger et al.

(10) Patent No.: US 11,753,080 B2
(45) Date of Patent: Sep. 12, 2023

(54) VEHICLE STRUCTURAL COMPONENT, MODULAR SYSTEM AND METHOD FOR PRODUCING VEHICLE STRUCTURAL COMPONENTS

(71) Applicant: Bayerische Motoren Werke Aktiengesellschaft, Munich (DE)

(72) Inventors: Thomas Hogger, Otterfing (DE); Christoph Jagoda, Landshut (DE); Octavian Knoll, Munich (DE); Oleg Konrad, Hohenthann Weihenstephan (DE); Sebastian Krull, Weihmichl (DE); Matthias Nagel, Lenggries (DE); Bernhard Staudt, Munich (DE); Tobias Wehrkamp-Richter, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 258 days.

(21) Appl. No.: 17/289,793

(22) PCT Filed: Oct. 1, 2019

(86) PCT No.: PCT/EP2019/076501
§ 371 (c)(1),
(2) Date: Apr. 29, 2021

(87) PCT Pub. No.: WO2020/088867
PCT Pub. Date: May 7, 2020

(65) Prior Publication Data
US 2021/0394834 A1    Dec. 23, 2021

(30) Foreign Application Priority Data
Oct. 30, 2018   (DE) .................. 10 2018 127 011.9

(51) Int. Cl.
| | | |
|---|---|---|
| *B62D 25/08* | (2006.01) | |
| *B62D 25/00* | (2006.01) | |
| *B62D 29/04* | (2006.01) | |

(52) U.S. Cl.
CPC ......... *B62D 25/081* (2013.01); *B62D 29/043* (2013.01)

(58) Field of Classification Search
CPC ........ B62D 25/00; B62D 25/02; B62D 25/04; B62D 25/081; B62D 29/043; B62D 29/046
See application file for complete search history.

(56) References Cited

U.S. PATENT DOCUMENTS 6,296,299 B1 *  10/2001  Hanakawa ............. B60J 5/0443
                                                        296/203.02
6,467,834 B1 *  10/2002  Barz .................... B62D 29/002
                                                        296/203.02
(Continued)

FOREIGN PATENT DOCUMENTS

| CN | 101749496 A | 6/2010 |
| CN | 103717689 A | 4/2014 |

(Continued)

OTHER PUBLICATIONS

International Search Report (PCT/ISA/210) issued in PCT Application No. PCT/EP2019/076501 dated Jan. 17, 2020 with English translation (five (5) pages).

(Continued)

*Primary Examiner* — Gregory A Blankenship
(74) *Attorney, Agent, or Firm* — Crowell & Moring LLP

(57) ABSTRACT

A vehicle structural component includes a main body having a receptacle and a first insert for reinforcing the vehicle structural component. The insert is accommodated in the receptacle and only partially fills the latter. At least one further insert fits in the receptacle. A modular system for (Continued)

producing vehicle structural components and a method for producing vehicle structural components are provided.

16 Claims, 3 Drawing Sheets

(56) References Cited

U.S. PATENT DOCUMENTS

| | | | | |
|---|---|---|---|---|
| 9,718,498 | B1* | 8/2017 | Faruque | B62D 29/046 |
| 2004/0084935 | A1* | 5/2004 | Johnson | B60S 1/3493 |
| | | | | 296/192 |
| 2004/0104598 | A1* | 6/2004 | Barz | B62D 25/04 |
| | | | | 296/187.02 |
| 2006/0033361 | A1* | 2/2006 | Frederick | B62D 25/00 |
| | | | | 296/187.01 |
| 2009/0085379 | A1* | 4/2009 | Takahashi | B62D 25/04 |
| | | | | 296/193.06 |
| 2009/0152896 | A1* | 6/2009 | Enderich | B62D 25/04 |
| | | | | 296/187.03 |
| 2010/0201158 | A1* | 8/2010 | Miyashita | B62D 25/04 |
| | | | | 428/83 |
| 2012/0263521 | A1 | 10/2012 | Auer et al. | |
| 2013/0049406 | A1* | 2/2013 | Hasl | B62D 29/001 |
| | | | | 296/203.02 |
| 2014/0021746 | A1 | 1/2014 | Franzpötter et al. | |
| 2014/0193659 | A1 | 7/2014 | Lanzerath et al. | |
| 2015/0048654 | A1 | 2/2015 | Eipper et al. | |
| 2015/0343742 | A1 | 12/2015 | Roemer | |
| 2016/0194036 | A1 | 7/2016 | Kurokawa | |
| 2016/0257348 | A1* | 9/2016 | Balur | B62D 25/02 |
| 2017/0173894 | A1* | 6/2017 | Konrad | B29C 70/24 |
| 2017/0361875 | A1* | 12/2017 | Ayuzawa | B62D 27/02 |
| 2017/0368802 | A1 | 12/2017 | Pfaffelhuber et al. | |
| 2018/0043938 | A1* | 2/2018 | Tsu | B62D 21/15 |
| 2018/0281872 | A1 | 10/2018 | Kuehner et al. | |
| 2019/0070803 | A1* | 3/2019 | Rocheblave | B62D 29/004 |
| 2019/0233010 | A1* | 8/2019 | Ichimaru | B62D 29/002 |
| 2019/0283805 | A1* | 9/2019 | Kurokawa | B62D 21/02 |
| 2020/0062320 | A1* | 2/2020 | Robinson | B32B 5/024 |
| 2020/0307708 | A1* | 10/2020 | Beil | B62D 25/06 |
| 2021/0078224 | A1* | 3/2021 | Delaney | B62D 29/004 |
| 2021/0094244 | A1* | 4/2021 | Mukainakano | B32B 3/02 |
| 2021/0394834 | A1* | 12/2021 | Hogger | B62D 25/081 |
| 2022/0111903 | A1* | 4/2022 | Baiju | B62D 25/04 |
| 2022/0126927 | A1* | 4/2022 | Kim | B62D 25/14 |
| 2022/0204095 | A1* | 6/2022 | Richardson | B62D 25/00 |
| 2022/0212725 | A1* | 7/2022 | Robinson | B62D 29/043 |
| 2022/0371664 | A1* | 11/2022 | Kohlbrenner | B62D 25/145 |

FOREIGN PATENT DOCUMENTS

| | | |
|---|---|---|
| CN | 103906676 A | 7/2014 |
| CN | 103974876 A | 8/2014 |
| CN | 108688730 A | 10/2018 |
| DE | 200 08 201 U1 | 8/2000 |
| DE | 10 2014 014 476 B3 | 9/2015 |
| DE | 10 2014 220 080 A1 | 4/2016 |
| DE | 10 2014 019 333 A1 | 6/2016 |
| DE | 10 2015 213 342 B3 | 11/2016 |
| DE | 10 2016 211 314 A1 | 12/2017 |
| EP | 2 511 084 A1 | 10/2012 |
| EP | 2 709 858 B1 | 12/2014 |
| WO | WO 2017/211528 A1 | 12/2017 |

OTHER PUBLICATIONS

German-language Written Opinion (PCT/ISA/237) issued in PCT Application No. PCT/EP2019/076501 dated Jan. 17, 2020 (six (6) pages).

German-language Search Report issued in German Application No. 10 2018 127 011.9 dated Sep. 10, 2019 with partial English translation (12 pages).

English translation of Chinese Office Action issued in Chinese Application No. 201980052269.5 dated Jun. 17, 2022 (eight (8) pages).

\* cited by examiner

VEHICLE STRUCTURAL COMPONENT, MODULAR SYSTEM AND METHOD FOR PRODUCING VEHICLE STRUCTURAL COMPONENTS

BACKGROUND AND SUMMARY OF THE INVENTION

The invention relates to a vehicle structural component, to a modular system for producing vehicle structural components and to a method for producing vehicle structural components.

Vehicle structural components serve for stiffening the vehicle structure and are for example vertical pillars or parts of the vehicle roof structure. Furthermore, they can serve for the attachment of flaps and functional elements thereof, such as spring damper elements.

Depending on the model and equipment of a vehicle there are frequently different requirements placed on the vehicle structural components used. In order to avoid a large variety of variants that would also entail a high degree of complexity in the control of the manufacturing processes, vehicle structural components are frequently designed for a maximum requirement. However, this means that the weight and the manufacturing costs of the vehicle structural component correspond in all vehicle variants to a maximum value even if lower requirements exist in some vehicle variants. This unnecessarily results in resources being consumed and the vehicle weight of at least some vehicle models being unnecessarily increased.

It is therefore an object of the present invention to provide a vehicle structural component that is optimized in terms of the existing requirements and to specify a modular system and a method for the efficient and cost-saving manufacture of vehicle structural components.

This object is firstly achieved according to the invention by a vehicle structural component, comprising a basic body having a receptacle and having a first insert for stiffening the vehicle structural component, that is accommodated in the receptacle and only partially fills the latter, and comprising at least one further insert which is seated in the receptacle.

By virtue of the further insert arranged in addition to the first insert in the receptacle, a higher degree of stiffness of the vehicle structural component is achieved than with only one insert. A vehicle structural component having a first insert which only partially fills the receptacle represents as it were a base variant of the vehicle structural component. The further insert, which is arranged in addition to the first insert in the receptacle, makes the vehicle structural component suitable for vehicle models having higher requirements going beyond the requirements in the base variant. The use of two inserts makes it possible in the manufacturing method to respond flexibly to the respective requirements.

The basic body is preferably a plastics component, in particular a fiber-reinforced plastics component. This allows the basic body to be produced in a simple and cost-effective manner. For example, the basic body is a short-fiber-reinforced thermoplastic. Short-fiber-reinforced thermoplastics can be injection-molded in a simple manner, with the result that the basic body can be produced in a simple manner through the use of such a plastic.

The at least one first insert and/or the at least one further insert can consist of a fiber-reinforced plastic. The use of a continuous fiber material is suitable for the inserts. The continuous fibers of the inserts can be impregnated with a resin. The continuous fibers preferably extend unidirectionally in the inserts, with the result that they display an anisotropic material behavior. Consequently, the vehicle structural component has a high degree of stiffness especially in the longitudinal direction.

According to one embodiment, the two inserts are in contact with one another along a longitudinal side. This allows the vehicle structural component to have a particularly compact design.

The receptacle is preferably formed by an elongate groove, and the first insert and the at least one further insert are preferably bar-shaped, wherein the profile of the inserts is designed to correspond to the profile of the elongate groove. That is to say that the inserts, in particular if the inserts are in contact with one another along a longitudinal side, together form a profile which corresponds to the profile of the receptacle. In this way, the inserts can be arranged in the receptacle in a particularly simple and accurately fitting manner. If the inserts are arranged in the receptacle, they have at least two opposite longitudinal sides bearing with full-surface contact against an inner wall of the receptacle.

The inserts inserted into the receptacle can fill, in particular can completely fill, the receptacle. Here, the further insert can terminate flush with an outer side of the vehicle structural component. There thus results, at least in the region of the inserts, an as far as possible stepless appearance of the vehicle structural component.

In order to fasten the first insert sufficiently securely to the basic body, the first insert is connected to the basic body for example by means of overmolding or by means of plastics welding.

The at least one further insert is preferably likewise connected to the basic body by means of plastics welding. As a result, the further insert can also be connected to the basic body at a later time than the first insert, in particular after completion of an injection-molding process.

According to one embodiment, the at least one first insert and/or the at least one further insert have/has a rectangular profile. The inserts can thus be able to be produced in a simple manner. For example, the inserts can be produced as long profiles which can then be cut to size according to the requirement.

The at least one first insert and the at least one further insert are preferably identical components, that is to say components with the same geometry and of the same material. A number of different component parts is thus kept low, which can have an advantageous effect on the overall costs of the vehicle structural component.

The vehicle structural component is for example a cowl, that is to say a strut, in particular a roof transverse structural component, which interconnects a left roof frame and a right roof frame in the vehicle transverse direction. Consequently, the vehicle structural component contributes to an overall stiffness of a vehicle. However, the vehicle structural component can also be used in other regions of the vehicle; for example, the vehicle structural component can form a vertical pillar.

The object is furthermore achieved according to the invention by a modular system for producing vehicle structural components, comprising identically configured basic bodies, which have at least one receptacle, and a plurality of inserts, wherein the receptacle and the inserts are tailored to one another in their geometry in such a way that optionally one or more inserts can be inserted into the same receptacle. It is thus possible by means of the modular system for the vehicle structural component, depending on the vehicle model, to be designed to correspond to the respective requirements.

In this context, the plurality of inserts can completely fill the receptacle without projecting therefrom. For example, two or more inserts together can completely fill the receptacle. The insert inserted last thus terminates flush with the outer surface of the basic body.

The basic bodies and the inserts are preferably plastics components which can be welded to one another. This means that the individual components can be reliably connected to one another even after an injection-molding process.

Furthermore, the object is achieved according to the invention by a method for producing vehicle structural components using the above-described modular system, wherein the method comprises the following steps:

a) providing a basic body having at least one receptacle for an insert, and providing a first insert seated in the receptacle; and b) inserting at least one further insert into the receptacle if the vehicle structural component is intended to have a higher strength than the component produced in step a).

Such a method offers the advantage that a vehicle structural component can be optimally designed for the respective requirements regardless of the vehicle model in which the vehicle structural component is used.

After inserting the at least one further insert, the receptacle can be closed by means of an outer skin which covers the receptacle. Alternatively, the receptacle can be closed by a cladding component. The design of the vehicle structural component is completed by covering the receptacle.

According to one embodiment of the method, after the first insert has been connected to the basic body, the at least one further insert can likewise be connected to the basic body. The connection between the further insert and the basic body is preferably realized by means of plastics welding.

The decision as to which requirements the vehicle structural component is intended to be designed for can thus be made relatively late in the manufacturing process, for example after assembly or completion of a body structure, in particular after a painting operation. There is thus no need until the insertion of the insert to control any additional variants due to the design of the vehicle structural component. In this way, the production times can be particularly short and the production store can be kept smaller on account of the reduced variant control.

In particular after the receptacle has been closed and/or after the vehicle structural component has been painted, the at least one further insert is welded to the basic body. Alternatively, it is conceivable that the further insert is connected to the basic body by adhesive bonding, riveting or form-fitting. The stated possibilities allow the insert to be permanently connected to the basic body.

The at least one first insert is for example connected to the basic body by being inserted into a corresponding mold and overmolded during the production of the basic body. This has the advantage that the insert is connected to the basic body in a particularly simple and efficient manner already during the production thereof, and no further assembly step is necessary for connecting the insert to the basic body.

In an alternative embodiment of the method, the basic body is produced by means of an additive manufacturing method, for example by means of 3D printing, and the at least one first insert is inserted into the receptacle and connected to the basic body, for example by means of plastics welding, after the basic body has been produced. This variant does not require a mold for producing the assembly consisting of basic body and first insert.

Further advantages and features of the invention will become apparent from the following description and from the following drawings to which reference is made.

DETAILED DESCRIPTION OF THE DRAWINGS

Figure 1:
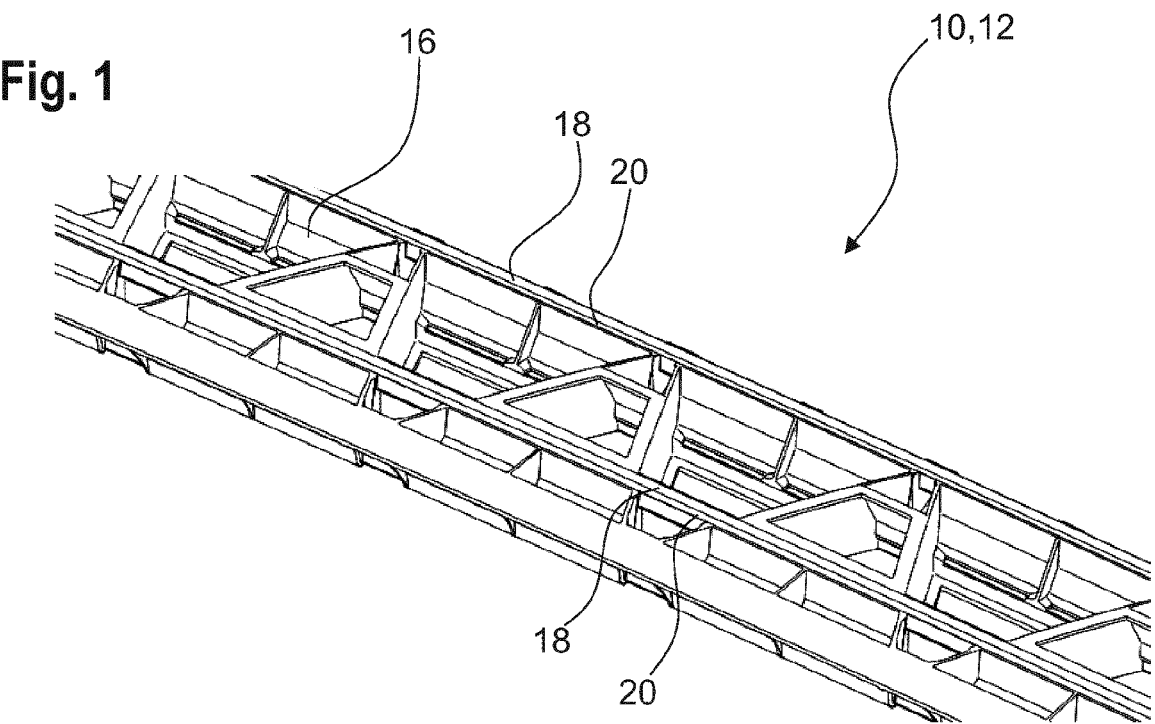
FIG. 1 shows part of an intermediate product during the production of a vehicle structural component according to an embodiment of the invention in a view from above.
Figure 2:
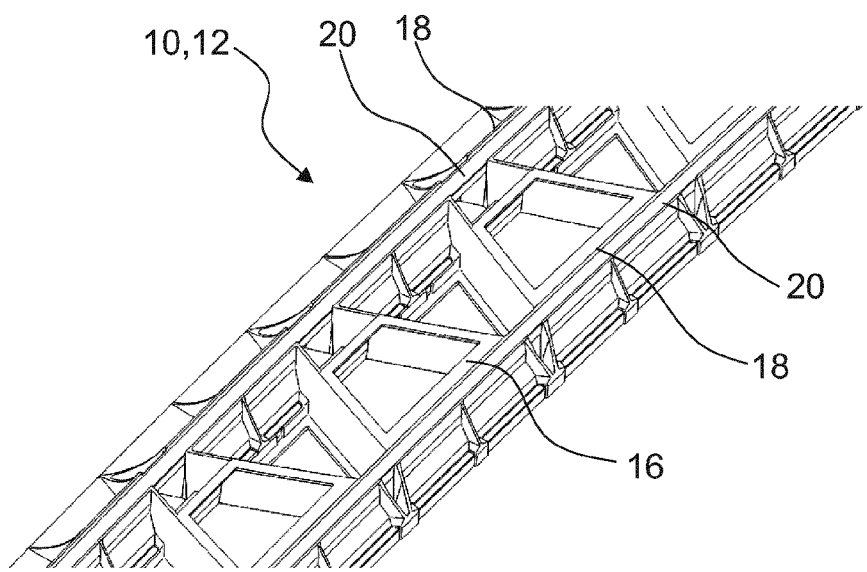
FIG. 2 shows part of the intermediate product from FIG. 1 in a view from below.
Figure 3:
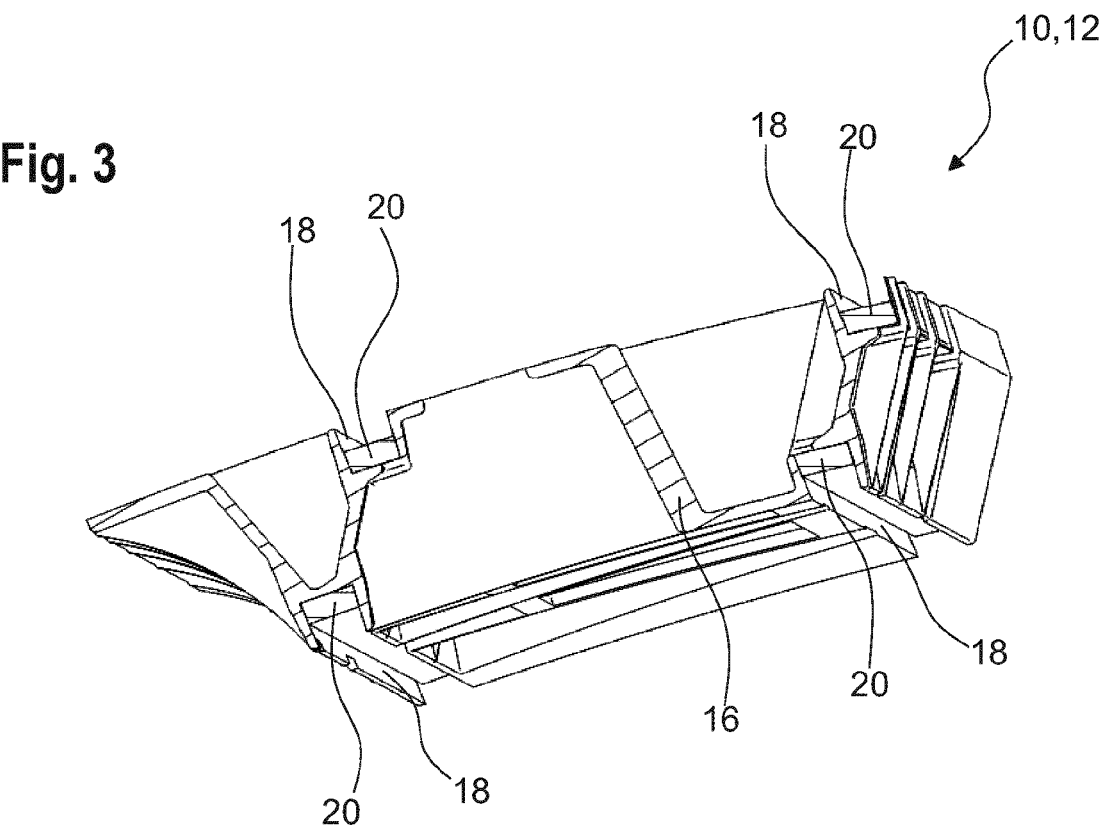
FIG. 3 shows a cross section through the intermediate product from FIG. 1.

FIGS. 1 to 3 each show a vehicle structural component 10, which represents an intermediate product 12 during the production of an exemplary vehicle structural component 14 (see FIG. 4) according to the invention. FIGS. 1 and 2 show part of the elongate vehicle structural component 10 in a respective view from above and from below. FIG. 3 shows a cross section through the vehicle structural component 10.

The intermediate product 12 itself is already a functional vehicle structural component 10, specifically a cowl for a motor vehicle.

As can be seen particularly well in particular in FIG. 3, the vehicle structural component 10 comprises a basic body 16 in which a plurality of receptacles 18 are present. The receptacles 18 are each formed by an elongate groove which has a rectangular profile and virtually completely extends or completely extends over the entire length of the vehicle structural component 10.

The basic body 16 is a plastics component, in particular consisting of a short-fiber-reinforced thermoplastic.

In the exemplary embodiment shown there are provided four receptacles 18, of which two receptacles 18 are arranged on an upper side and two receptacles 18 are arranged on a lower side of the vehicle structural component 10. The terms "upper side" and "lower side" relate here to an assembled state of the vehicle structural component 10 in a motor vehicle. However, the number of receptacles 18 can vary, depending on the type of the vehicle structural component 10.

In each of the receptacles 18 there is respectively arranged a first insert 20. For example, the first inserts 20 can be reliably connected to the basic body 16 by means of overmolding or plastics welding.

The inserts 20 are preferably fiber-reinforced and contain continuous fibers. The inserts 20 serve for stiffening the vehicle structural component 10 and, just like the receptacles 18, extend virtually completely or extend completely over the entire length of the vehicle structural component 10.

In the exemplary embodiment shown, the first inserts 20 are bar-shaped and have a rectangular profile. Contemplated, however, are also other profile shapes of the inserts 20, with the profiles of the inserts 20 and of the receptacles 18 being tailored to one another in such a way that no empty spaces result in the vehicle structural component 10. That is to say that the inserts 20 are adapted to the profile of the receptacles 18.

If a first insert 20 is arranged in a receptacle 18, it does not completely fill the latter, with the result that a receptacle remains for a further insert 24.

Figure 4:
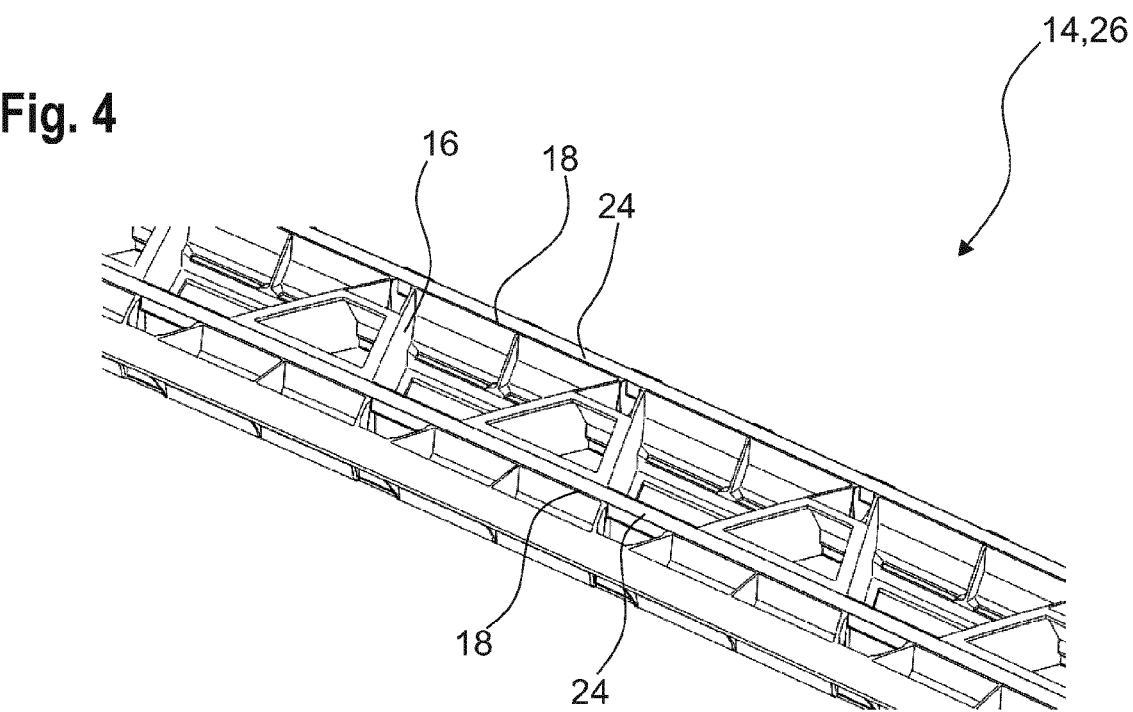
FIG. 4 shows part of an exemplary vehicle structural component according to the invention in a view from above.
Figure 5:
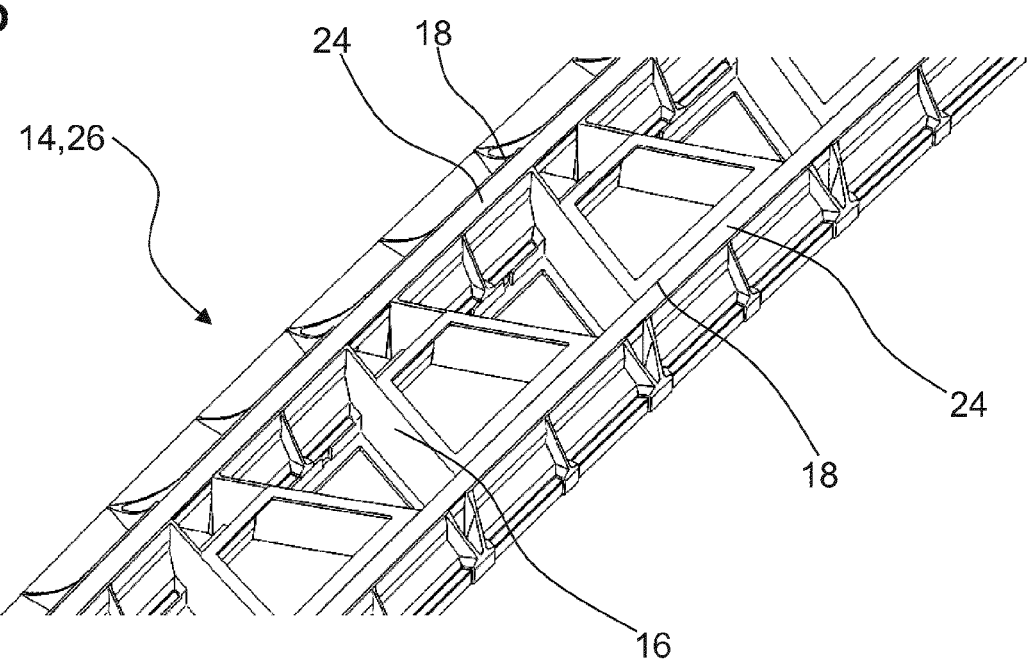
FIG. 5 shows part of the exemplary vehicle structural component according to the invention in a view from above.
Figure 6:
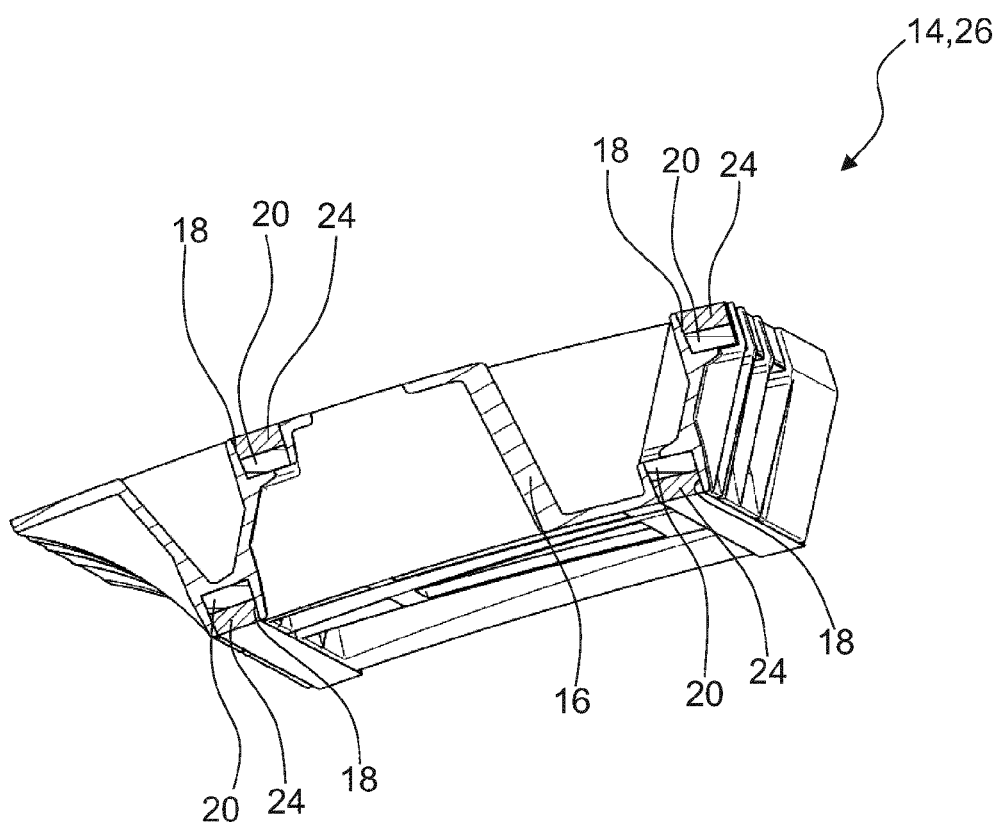
FIG. 6 shows a cross section through the exemplary vehicle structural component according to the invention.

The vehicle structural component 14 illustrated in FIGS. 4 to 6 differs from the intermediate product 12 illustrated in FIGS. 1 to 3 by virtue of the fact that a further insert 24 is additionally seated in each receptacle 18. As a result of the further insert 24, a strength of the vehicle structural component 14, in particular a stiffness in the vehicle transverse direction, with respect to an assembled state of the vehicle structural component 14, is increased by comparison with the above-described vehicle structural component 10.

Consequently, the vehicle structural component 14 can be adapted to the respectively prevailing requirements as a result of the further insert 24 and can take up higher loads than a vehicle structural component 10 in which in each case only a first insert 20 is arranged in the receptacles 18.

The additional insert 24 is preferably welded to the basic body 16, in particular by means of plastics welding.

By means of the inserts 20, 24 together, the receptacle 18 is completely filled without the inserts 24 projecting from the receptacle. As a result, the inserts 24 extend along an upper side or a lower side of the vehicle structural component 14, that is to say along an outer surface of the vehicle structural component 10. In particular, part of the outer surface of the vehicle structural component 14 is formed by a surface of an insert 24.

The first inserts 20 and the further inserts 24 are preferably identical components having an identical cross section, as illustrated in FIG. 6. In this way, the inserts can equally be used as first inserts 20 or as further inserts 24.

In an assembled state, as shown in FIGS. 4 to 6, the inserts 20, 24 are in contact with one another along a longitudinal side.

To produce the vehicle structural component 14 according to the invention there is provided a modular system 26 according to the invention that has identically configured basic bodies 16 and a plurality of inserts 20, 24. The basic bodies 16 and the inserts 20, 24 of the modular system 26 correspond to the components shown in the figures. It is thus possible for the required number of inserts 20, 24 to be inserted into the basic body 16 during the production of the vehicle structural component 14 according to the invention.

In order to produce a vehicle structural component 14 according to the invention using the modular system 26, the following steps are carried out.

First of all, a basic body 16 having at least one receptacle 18 for an insert 20, 24 and also a first insert 20 seated in the receptacle 18 are provided.

The first insert 20 has been connected to the basic body 16 either in an injection-molding process for the production thereof by the insert 20 having been inserted into a mold and overmolded with plastic. Alternatively, the first insert 20 can be connected to the basic body 16 by means of plastics welding. In this case, the basic body 16 can have been produced either by means of injection-molding or by means of an additive manufacturing method, for example by means of 3D printing.

This intermediate product 12, which comprises the basic body 16 and in each case a first insert 20 per receptacle 18, but no further insert 24, corresponds to the vehicle structural component 10 which is illustrated in FIGS. 1 to 3 and which already satisfies the requirements of some vehicle models. In particular, the intermediate product 12 is distinguished by the fact that the receptacles 18 are not completely filled, that is to say that there is still space for at least one further insert 24 in the receptacle.

If, however, the vehicle structural component 14 is intended to have a higher strength than the vehicle structural component 10 produced in the preceding step, a further insert 24 is inserted into the receptacle 18.

The insertion of the at least one further insert 24 into the receptacle 18 occurs here at a later time in the manufacturing process than the insertion of the first insert 20, for example after a painting operation.

After the insertion of the further insert 24, the receptacle 18 can be closed by means of an outer skin (not shown), which covers the receptacle 18, or by means of a cladding component (not shown).

The welding of the at least one further insert 24 to the basic body 16 can occur before or after closing the receptacle 18 of the vehicle structural component 14.

What is claimed is:

1. A vehicle structural component, comprising:
a basic body having a receptacle;
a first insert for stiffening the vehicle structural component, the first insert being accommodated in the receptacle and only partially filling the receptacle; and
at least one further insert which fits in the receptacle, wherein
the first insert is connected to the basic body by overmolding or by plastics welding.

2. The vehicle structural component according to claim 1, wherein
the basic body is a fiber-reinforced plastic component.

3. The vehicle structural component according to claim 1, wherein
the at least one first insert and/or the at least one further insert is made of a fiber-reinforced plastic.

4. The vehicle structural component according to claim 1, wherein
the first and further inserts are in contact with one another along a longitudinal side.

5. The vehicle structural component according to claim 1, wherein
the receptacle is formed by an elongate groove, and
the first insert and the at least one further insert are bar-shaped, wherein a profile of the inserts corresponds to a profile of the elongate groove.

6. The vehicle structural component according to claim 1, wherein
the first and further inserts inserted into the receptacle fill the receptacle.

7. The vehicle structural component according to claim 1, wherein
the at least one further insert is connected to the basic body by plastics welding.

8. The vehicle structural component according to claim 1, wherein
the first insert and/or the at least one further insert has a rectangular profile.

9. The vehicle structural component according to claim 1, wherein
the first insert and the at least one further insert are identical components.

10. The vehicle structural component according to claim 1, wherein
the vehicle structural component is a cowl.

11. A modular system for producing vehicle structural components, comprising:
identically configured basic bodies, which have at least one receptacle; and
a plurality of inserts, wherein the receptacle and the inserts are tailored to one another in their geometry such that optionally one or more inserts are insertable into the same receptacle, wherein
the basic bodies and the inserts are plastic components which are weldable to one another.

12. The modular system according to claim 11, wherein the plurality of inserts completely fill the receptacle without projecting therefrom.

13. A method for producing vehicle structural components using a modular system, the method comprising:
 a) providing a basic body having at least one receptacle for an insert, and providing a first insert seated in the receptacle in order to produce a component; and
 b) inserting at least one further insert into the receptacle of the provided basic body, wherein the vehicle structural component is intended to have a higher strength than the component produced in step a), wherein
 after the first insert is connected to the basic body, the at least one further insert is likewise connected to the basic body, and
 after the receptacle has been closed and/or after the vehicle structural component has been painted, the at least one further insert is welded to the basic body.

14. The method according to claim 13, wherein the receptacle is closed by an outer skin which covers the receptacle.

15. The method according to claim 13, wherein the first insert is connected to the basic body by being inserted into a corresponding mold and overmolded during production of the basic body.

16. The method according to claim 13, wherein the basic body is produced by an additive manufacturing method and, after the basic body has been produced, the first insert is inserted into the receptacle and connected to the basic body.

* * * * *